United States Patent
Dubodelov et al.

(10) Patent No.: US 10,747,587 B2
(45) Date of Patent: Aug. 18, 2020

(54) DYNAMIC RULE-BASED TRANSFORMATION OF API CALLS

(71) Applicant: Microsoft Technology Licensing, LLC, Redmond, WA (US)

(72) Inventors: Vyacheslav Dubodelov, Redwood City, CA (US); Justin R. Kominar, Monte Sereno, CA (US); Sanjeev Ojha, Fremont, CA (US); Fred L. Cheng, San Jose, CA (US); Adam M. Trachtenberg, Mountain View, CA (US)

(73) Assignee: Microsoft Technology Licensing, LLC, Redwood Shores, CA (US)

(*) Notice: Subject to any disclaimer, the term of this patent is extended or adjusted under 35 U.S.C. 154(b) by 162 days.

(21) Appl. No.: 15/797,960

(22) Filed: Oct. 30, 2017

(65) Prior Publication Data

US 2019/0129765 A1    May 2, 2019

(51) Int. Cl.
| | | |
|---|---|---|
| *G06F 9/54* | (2006.01) | |
| *G06F 21/62* | (2013.01) | |
| *G06F 21/53* | (2013.01) | |

(52) U.S. Cl.
CPC .............. *G06F 9/541* (2013.01); *G06F 21/53* (2013.01); *G06F 21/629* (2013.01); *G06F 21/6218* (2013.01)

(58) Field of Classification Search
CPC ........ G06F 9/541; G06F 21/629; G06F 21/53; G06F 21/6218
See application file for complete search history.

(56) References Cited

U.S. PATENT DOCUMENTS

| | | | |
|---|---|---|---|
| 6,920,443 B1 | 7/2005 | Cesare et al. | |
| 8,863,156 B1* | 10/2014 | Lepanto | G06F 9/44521 |
| | | | 719/328 |
| 2008/0140475 A1* | 6/2008 | Li | G06Q 10/06 |
| | | | 705/7.11 |
| 2013/0047216 A1 | 2/2013 | Ajitomi et al. | |
| 2014/0229815 A1* | 8/2014 | Clifford | G06F 17/243 |
| | | | 715/224 |
| 2016/0127254 A1 | 5/2016 | Kumar et al. | |
| 2018/0210768 A1* | 7/2018 | Dai | G06F 9/541 |

OTHER PUBLICATIONS

"International Search Report and Written Opinion Issued in PCT Application No. PCT/US2017/067949", dated Feb. 22, 2018, 7 Pages.

* cited by examiner

*Primary Examiner* — Doon Y Chow
*Assistant Examiner* — Kimberly L Jordan
(74) *Attorney, Agent, or Firm* — Hickman Palermo Becker Bingham LLP

(57) ABSTRACT

The disclosed embodiments provide a system for processing application-programming interface (API) calls. During operation, the system identifies a set of transformation rules that match one or more permissions associated with a first representation of a request to an API. Next, the system applies the set of transformation rules to a first set of fields in the first representation of the request to generate a second representation of the request, wherein the second representation of the request includes a second set of fields that is different from the first set of fields. The system then triggers processing of the request using the second set of fields by a service providing the API.

20 Claims, 5 Drawing Sheets

DYNAMIC RULE-BASED TRANSFORMATION OF API CALLS

BACKGROUND

Field

The disclosed embodiments relate to techniques for processing calls to application-programming interfaces (APIs). More specifically, the disclosed embodiments relate to techniques for performing dynamic rule-based transformation of API calls.

Related Art

Application-programming interfaces (APIs) are commonly created and exposed to provide functionality related to a software component or service independently of the implementation of the component or service. For example, an API for a web resource, operating system, database, and/or graphical-user interface (GUI) may allow other components to request data, store data, share content, utilize features, perform computations, and/or carry out other tasks using the API.

On the other hand, APIs may be associated with contexts, permissions, service level agreements, programming languages, protocols, and/or other attributes that limit widespread adoption and use of the APIs. For example, an API that is written for use by services that are internal to an organization or that are associated with a certain set of access rights may expose sensitive, proprietary, or non-descriptive data or functionality to entities outside the organization and/or entities with a different set of access rights. Consequently, multiple versions of an API may be manually created to adapt the API's functionality to different use cases or permissions.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
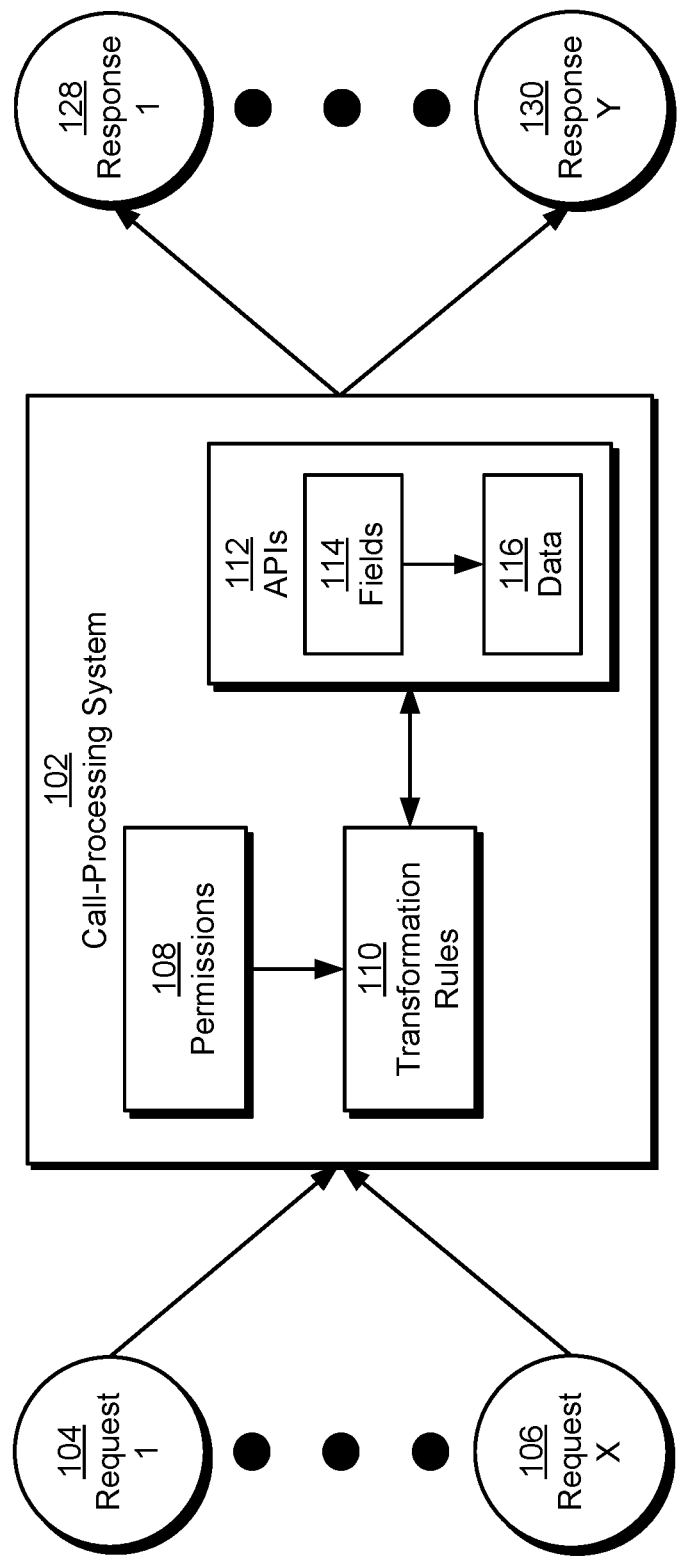
FIG. 1 shows a schematic of a system in accordance with the disclosed embodiments.

The disclosed embodiments provide a method, apparatus and system for processing calls to application-programming interfaces (APIs). As shown in FIG. 1, the system includes a call-processing system 102 that receives and/or intercepts requests (e.g., request 1 104, request x 106) to a set of APIs 112 and mediates and/or manages the generation of responses (e.g., response 1 128, response y 130) to the requests by APIs 112. For example, call-processing system 102 may function as a "gateway" between external senders of the requests and services providing APIs 112 that are internal to an organization and/or other entity. In another example, call-processing system 102 may act as an intermediary between applications that belong to the same organization as the services but that are unable to make direct calls to APIs 112 (e.g., because the applications reside outside of data centers on which services providing APIs 112 are hosted). As a result, call-processing system 102 may be used to perform authentication, identity assurance, access control, throttling, data obfuscation, data abstraction, context management, and/or other operations during processing of the requests and/or responses.

More specifically, call-processing system 102 may apply transformation rules 110 to fields 114 and/or data 116 associated with fields 114 in requests and/or responses associated with calls to APIs 112. Each set of transformation rules 110 may be associated with one or more permissions 108 that are granted to individuals, applications, and/or other entities representing senders of the requests. For example, each permission may represent an access control configuration for one or more APIs provided by a social network. As a result, the permission may be assigned to applications that access the social network, members of the social network, and/or combinations of members and applications that access the social network (e.g., applications that access the social network on behalf of authenticated members of the social network).

In turn, transformation rules 110 associated with the permission may represent access control rules that are used to grant or restrict access to the functionality of the corresponding APIs 112. For example, call-processing system 102 may use transformation rules 110 to inject, remove, filter, validate, and/or override fields 114 and/or data 116 in each request used to initiate an API call after the request is received from a sender. After transformation rules 110 are applied to the request, call-processing system 102 may transmit the request to a service providing the corresponding API and receive a response to the request from the service. Call-processing system 102 may then apply additional transformation rules 110 to fields 114 and/or data 116 in the response prior to transmitting the response to the sender.

Figure 2:
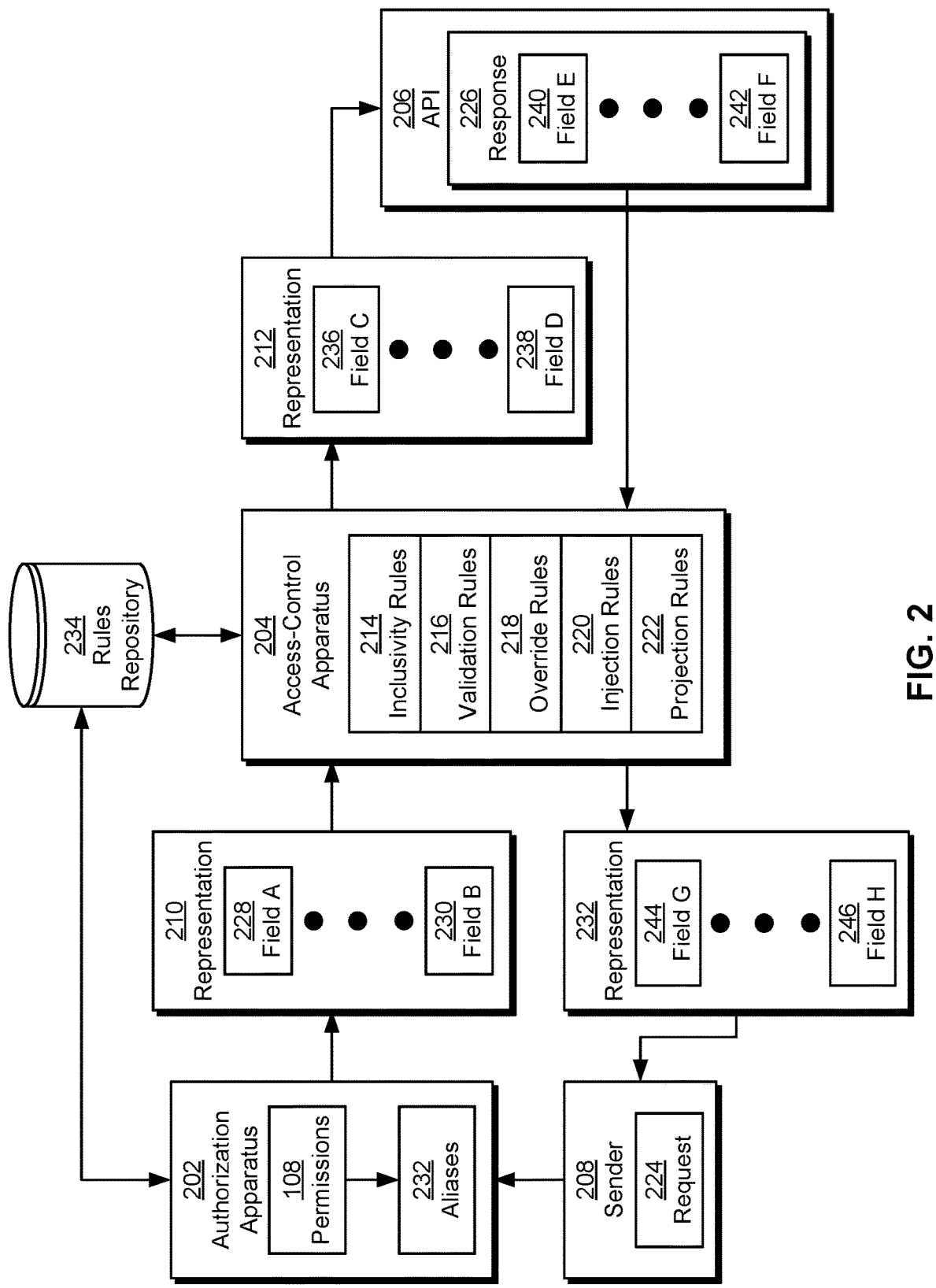
FIG. 2 shows a system for processing calls to an application-programming interface (API) in accordance with the disclosed embodiments.

As shown in FIG. 2, a system for processing calls to an API 206 (e.g., call-processing system 102 of FIG. 1) may include an authorization apparatus 202 and an access-control apparatus 204. Authorization apparatus 202 may receive a request 224 from a sender 208 over a network connection and/or other communication channel. For example, request 224 may be a web service and/or HyperText Transfer Protocol (HTTP) request that is received from a client application or service.

After request 224 is received, authorization apparatus 202 may match sender 208 to one or more permissions 108 assigned to sender 208. For example, each permission may be assigned to one or more users, applications, and/or other entities representing callers of the API. Authorization apparatus 202 may obtain an authentication credential for sender 208 (e.g., an OAuth or other access token) from request 224, verify that the authentication credential is valid (e.g., not expired or revoked) and use the authentication credential to retrieve one or more permissions 108 assigned to sender 208.

As mentioned above, each permission may include one or more access control configurations that specify how APIs can be used by callers of the APIs. For example, the permission and/or access control configurations may include and/or reference transformation rules (e.g., transformation rules 110 of FIG. 1) that limit access to certain features of the APIs by external callers of the APIs.

Each permission may also specify or reference one or more aliases 232 for APIs accessed through the system. For example, an API (e.g., API 206) provided by a web service may be used to query for nodes and edges representing entities and relationships in a social network. The API may be called by internal applications or services using the path of "GET/networkRelationships." To limit responses of the API to public entities and relationships (e.g., social network members that are explicitly connected with one another instead of implicitly linked through common employers or schools), a permission associated with the API may include a mapping from an external alias (e.g., "GET/publicConnections") to the path and transformation rules that limit access to the API to querying for public connections and entities.

After permissions 108 are retrieved for sender 208, authorization apparatus 202 may use permissions 108 to verify that sender 208 is allowed to access one or more APIs through the system before further processing request 224. For example, authorization apparatus 202 may resolve a resource providing API 206 by matching the name of request 224 to an alias in permissions 108 and using the alias to identify a corresponding path for the resource. Authorization apparatus 202 may then initialize an invocation context that identifies sender 208, permissions 108, and/or other parameters that determine the level of access granted to sender 208 in calling API 206 and/or other APIs associated with request 224. Conversely, if the name of request 224 does not match any aliases associated with permissions 108 for sender 208, authorization apparatus 202 may determine that sender has not been granted access to any APIs associated with the name and drop request 224.

Next, authorization apparatus 202 and/or another component of the system may convert request 224 into a representation 210 that includes a set of fields (e.g., field A 228, field B 230) from request 224. For example, the component may parse various components of request 224 into a data structure such as a tree. A root node in the tree may represent a header (e.g., name) of the request, and child nodes of the root node may represent a body, keys (e.g., user keys, resource keys, etc.), parameters (e.g., query parameters), and/or projections (e.g., specific data elements from records to be returned in a response to request 224 instead of all data elements in the records).

Access-control apparatus 204 may then enforce access control for API 206 by applying, to representation 210, a set of transformation rules associated with permissions 108 assigned to sender 208. As shown in FIG. 2, the transformation rules may include one or more inclusivity rules 214, validation rules 216, override rules 218, injection rules 220, and/or projection rules 222. The transformation rules may be stored with the corresponding permissions 108 and/or aliases 232 in a database, data warehouse, cloud storage, filesystem, and/or other data-storage providing rules repository 234, or the transformation rules may be stored in a separate repository from permissions 108 and/or aliases 232.

More specifically, one or more components of access-control apparatus 204 may use the transformation rules to convert fields in representation 210 into a different representation 212 that contains a different set of fields (e.g., field C 236, field D 238). For example, access-control apparatus 204 may include a series of "access control modules" that apply one or more types of transformation rules (e.g., inclusivity rules 214, validation rules 216, override rules 218, injection rules 220, and/or projection rules 222) to one or more portions of representation 210 (e.g., header, body, keys, parameters, and/or projections). Each module may be applied to request 224 and/or a response 226 to request 224 and operate independently from other modules in access-control apparatus 204. In other words, modules in access-control apparatus 204 may execute sequentially and/or in parallel without dependencies on one another. As a result, execution of the modules may be configured or ordered in a way that allows certain rules and/or modules to take precedence over other rules and/or modules. Alternatively, the execution of one or more modules in access-control apparatus 204 may depend on the execution or output of one or more other modules in access-control apparatus 204.

Inclusivity rules 214 may be used to require and/or exclude certain fields in request 224. For example, an exemplary inclusivity rule may specify a whitelist of allowed fields in the following representation:

NodeInclusivity:IN:Body: active, app, id, message, urn

In the above representation, "NodeInclusivity:IN:Body" is used to declare an inclusivity rule that is applied to a body of a request (e.g., request 224). The declaration is followed by a list of allowed fields named "active," "app," "id," "message," and "urn" in the body.

Inclusivity rules 214 may also, or instead, be used to specify a list of required fields in request 224. Continuing with the previous example, the exemplary inclusivity rule may include a keyword, flag, or other indicator that specifies that the "urn" field is required in the request. Thus, request 224 may be dropped if representation 210 includes fields that are not whitelisted by inclusivity rules 214 and/or omits any fields that are required by inclusivity rules 214.

Validation rules 216 may be used validate the values of fields in request 224. Each validation rule may identify one or more fields in request 224, as well as one or more allowed values for the field(s). The allowed values may be specified as one or more constant values, a range of values, a regular expression, a data type, and/or one or more functions that operate on the values to return validation results. For example, a validation rule may include a function that verifies that the value of a key in request 224 represents a member of a social network. If the value of the key represents another type of entity and/or an invalid value, request 224 may be dropped.

In another example, an exemplary validation rule may include the following representation:

NodeValidation:IN:Body:/adCampaigns/type(TEXT_AD)

In the above representation, "NodeValidation:IN:Body" is used to specify a validation rule that is applied to a body of a request. The validation rule then identifies a field named "/adCampaigns/type" and a constant value of "TEXT_AD" against which the field is validated. Consequently, any request that includes a different value in the field may fail validation and be dropped.

Override rules 218 may be used to change the values of fields in request 224. Each override rule may identify a field in request 224, as well as a value to be used as a replacement for a current value of the field in request 224. The override rule may specify the replacement value as a constant value and/or a function that transforms the current value into the replacement value. If the field is not present in request 224 or representation 210, the override rule may be skipped during conversion of representation 210 into representation 212 instead of causing request 224 to be dropped.

For example, an override rule may include the following representation:

Override:IN:Params:DecodeMemberURN( ):/user

In the above representation, "Override:IN:Params" specifies an override rule that is applied to the parameters of a request. The validation rule also identifies a function named "DecodeMemberURN" that is to be applied to a "user" field to generate a replacement value for the field. Thus, the override rule may be used to replace an encoded user key in request 224 with a decoded member URN that identifies a member of a social network.

Injection rules 220 may be used to inject new fields into request 224. For example, sender 208 may be restricted to creating advertising campaigns of a specific type (e.g., text-based advertisements) through API 206 by specifying an injection rule that adds a field of "TEXT_AD" to a field named "type" in request 224. If the field is already found in representation 210 (e.g., with a different value), request 224 may be dropped to avoid conflicts in processing of request 224.

In another example, an injection rule may include the following representation:

Inject:IN:Body:fetchMemberID( )/owner

In the above representation, "Inject:IN:Body" specifies an injection rule that is applied to the body of a request. The injection rule further identifies a function named "fetch-MemberID" that is to be used to generate a value that is injected into a field named "owner" in the request.

Projection rules 222 may identify a set of allowed projection fields that can be specified in request 224. For example, a projection rule may include the following representation:

NodeInclusivity:IN:Projections: firstName, lastName, location:postalCode

The projection rule may be specified as an inclusivity rule that applies to projection fields in a request (i.e., "NodeInclusivity:IN:Projections"). The projection rule also indicates that the "firstName," "lastName," and "location:postalCode" projection fields are allowed in the request. In other words, projection rules 222 may ensure that request 224 can only be used to retrieve a limited set of fields from a backend service providing API 206 by injecting the fields into a "requested fields" parameter and/or ensuring that any fields already present in the parameter are a strict subset of the allowed fields.

Those skilled in the art will appreciate that multiple permissions 108 may be assigned to sender 208, which may cause multiple sets of transformation rules from multiple access control configurations to be applied to representation 210. As a result, access-control apparatus 204 may include functionality to merge multiple, potentially conflicting sets of transformation rules into a single set of transformation rules that is applied to representation 210 to produce representation 212.

In particular, access-control apparatus 204 may merge multiple sets of allowed attributes from inclusivity rules 214 and/or projection rules 222 into a single superset of allowed attributes. For example, sender 208 may be associated with two access control configurations; the first configuration may specify allowed projection fields of "firstName," "lastName," and "location:postalCode" in request 224, and the second configuration may specify allowed projection fields of "id" and "firstName" in request 224. As a result, the configurations may be merged into a single set of allowed projection fields that includes firstName," "lastName," "location:postalCode," and "id."

Access-control apparatus 204 may similarly merge multiple validation rules 216 for a given field into a single rule that specifies a set of allowable values for the field. For example, two access control configurations may specify two separate validation rules 216 using the following:

NodeInclusivity:IN:Body:/adCampaigns/type:(TEXT_AD)
NodeInclusivity:IN:Body:/adCampaigns/type: (SPONSORED_UPDATES)

The validation rules may be merged into a single validation rule with the following representation:

NodeInclusivity:IN:Body:/adCampaigns/type: (TEXT_AD, SPONSORED_UPDATES)

As a result, an "/adCampaigns/type" field with a value of either "TEXT_AD" or "SPONSORED_UPDATES" may pass the merged validation rule.

Conversely, multiple sets of override rules 218 and injection rules 220 may be merged only if conflicts are not found in the corresponding modifications. For example, access-control apparatus 204 may detect a conflict in the following override two rules:

```
Override:IN:Body:encodeURN( ):/adAccountUsers/user
Override:IN:Body:fetchMemberID( ):/adAccountUsers/user
```

The first override rule may use a function named "encodeURN" to override the value of a field named "/adAccountUsers/user," and the second override rule may use a different function named "fetchMemberID" to override the same field with a potentially different value.

Along the same lines, access-control apparatus 204 may detect a conflict in the following two injection rules:

```
Inject:IN:Params:encodeURN( ):/search/searchParams.
    searchTrackingInfo.searchId
Inject:IN:Params:fetchMemberID( ):/search/searchParams.
    searchTrackingInfo.searchId
```

The first injection rule may use a function named "encodeURN" to inject a value into a field named "/search/searchParams.searchTrackingInfo.searchId," and the second injection rule may use a different function named "fetchMemberID" to inject a potentially different value into the same field.

When two or more sets of transformation rules assigned to a given permission and/or sender produce conflicting modifications in one or more fields of a request, access-control apparatus 204 and/or another component of the system may generate an error indicating the conflicting rules and prevent subsequent processing of requests using the conflicting rules. On the other hand, a conflict may be avoided when multiple override rules and/or injection rules perform the same operation on a field (e.g., by applying the same function or operation to the field). As a result, the duplicate rules may be merged into a single rule that is applied to representation 210 to produce representation 212.

After representation 212 is generated from the transformation rules, access-control apparatus 204 and/or another component of the system may call API 206 using the fields in representation 212, and a service providing API 206 may generate response 226 from the fields. For example, the service may execute a query, store data, transform data, implement a feature, and/or perform another task using the fields specified in representation 212 and generate response 226 based on the performed task.

After response 226 is received from API 206, access-control apparatus 204 may apply additional inclusivity rules 214, validation rules 216, override rules 218, injection rules 220, projection rules 222, and/or other types of transformation rules to a set of fields (e.g., field E 240, field F 242) in response 226. As with request 224, fields in response 226 may be used by access-control apparatus 204 and/or another component of the system to populate a data structure before the transformation rules are applied to the fields. For example, response 226 may include a header, a body, one or more keys, one or more parameters, and/or one or more projections.

In turn, the transformation rules may be used to produce a representation 232 of response 226 that includes a different set of fields (e.g., field G 244, field H 246). For example, access-control apparatus 204 may use the transformation rules to filter the fields, validate values in the fields, override values in the fields, and/or inject new fields in response 226. Access-control apparatus 204 and/or another component of the system may then transmit representation 232 to sender 208 in lieu of response 226, thereby enforcing access control for the entire request-response cycle involved in processing a call to API 206.

By modifying requests and/or responses associated with API calls using configurable permissions 108, aliases 232, and/or transformation rules, the system of FIG. 2 may enable fine-grained access control, adaptation to changing externalization requirements, data obfuscation, field decoration, and/or context management during processing of the API calls. In turn, the system may reduce manual overhead and/or management associated with creating multiple versions of APIs to accommodate requirements and/or constraints associated with different types of callers of the APIs. For example, multiple permissions 108, aliases 232, and/or sets of transformation rules may be used to create multiple context-sensitive API endpoints that map to a single backend service. The API endpoints may thus be used as "new" services that behave according to the corresponding transformation rules while leveraging the same backend service to generate responses to requests directed to the API endpoints. Consequently, the system of FIG. 2 may improve and streamline the use of APIs by different types of callers, as well as customization and maintenance of the APIs by developers and/or administrators of the APIs.

Those skilled in the art will appreciate that the system of FIG. 2 may be implemented in a variety of ways. First, authorization apparatus 202, access-control apparatus 204, and/or rules repository 234 may be provided by a single physical machine, multiple computer systems, one or more clusters, one or more virtual machines, a grid, one or more databases, one or more filesystems, and/or a cloud computing system. Authorization apparatus 202 and/or access-control apparatus 204 may also be implemented together and/or separately by one or more hardware and/or software components and/or layers. Authorization apparatus 202, access-control apparatus 204, and/or rules repository 234 may further be scaled to the volume of requests and/or number of APIs transformed using the system.

Second, access-control apparatus 204 may apply different types and/or sets of transformation rules to request 224 and/or response 226 to change access to API 206 by sender 208 and/or the functionality of API 206. For example, access-control apparatus 204 may apply custom transformation rules that perform scoring-based decisions, data cleansing based on user opt-outs, and/or other specialized operations on request 224 and/or response 226, in lieu of or in addition to inclusivity rules 214, validation rules 216, override rules 218, injection rules 220, and/or projection rules 222.

Third, permissions 108, aliases 232, and/or transformation rules used in processing API calls may be obtained from a number of sources. For example, access control configurations for multiple APIs and/or entities using the APIs may be specified and/or enforced using configuration files, rules engines, executable modules, "self-service" API configuration services, and/or other mechanisms for performing dynamic, flexible configuration of software platforms.

Fourth, the system of FIG. 2 may be used to perform monitoring and/or throttling of calls to API 206 and/or other APIs. For example, authorization apparatus 202, access-control apparatus 204, and/or another component of the system may be used to track and throttle incoming requests to the APIs on a per-user and/or per-application basis and generate notifications of warnings and/or dropped requests to senders of the requests.

Figure 3:
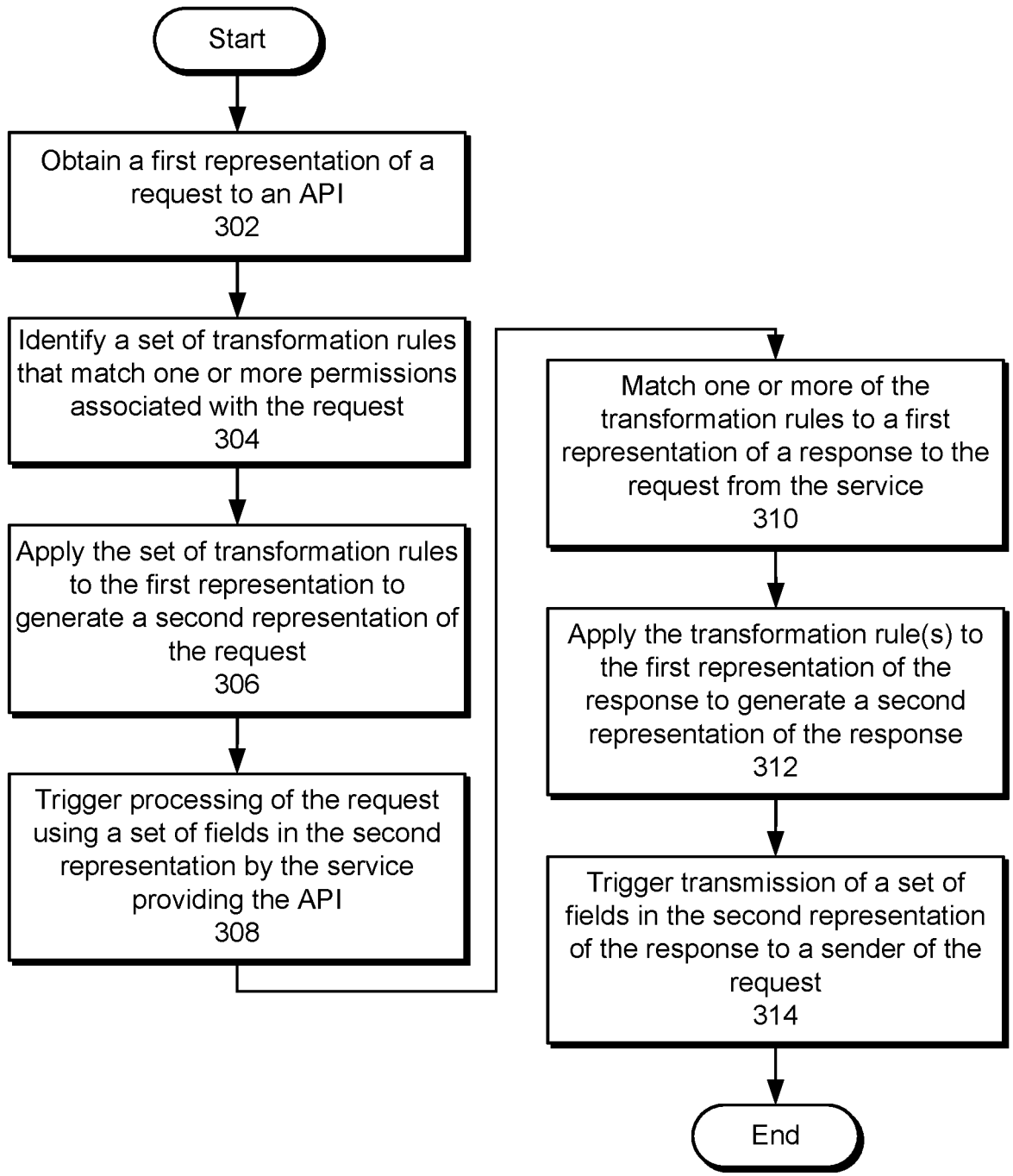
FIG. 3 shows a flowchart illustrating the processing of a call to an API in accordance with the disclosed embodiments.

FIG. 3 shows a flowchart illustrating the processing of a call to an API in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a first representation of a request to an API is obtained (operation 302). For example, the request may be parsed to generate the first representation as a data structure (e.g., a tree) containing a set of fields. The fields may include, but are not limited to, a header, body, parameters, projections, and/or keys in the request.

Next, a set of transformation rules that match one or more permissions associated with the request is identified (operation 304), as described in further detail below with respect to FIG. 4. The transformation rules are then applied to the first representation to generate a second representation of the request (operation 306).

For example, the transformation rules may include an inclusivity rule that specifies a set of allowed fields in the request, a projection rule that specifies a set of allowed fields in a response to the request, a validation rule that validates a value of a field in the request, an override rule that overrides a value of a field in the request, and/or an injection rule that injects a value into a field in the request. Each transformation rule may be applied independently of other transformation rules for the request, or the transformation rules may be applied according to and/or based on dependencies among one another. In turn, the transformation rules may be used to generate the second representation so that fields in the second representation are a subset of the fields in the first representation, a superset of the fields in the first representation, and/or assigned to different values than fields in the first representation.

After the second representation of the request is produced, processing of the second representation by the service providing the API is triggered (operation 308). For example, fields in the second representation may be arranged in a format that complies with a call to the API, and the call may be triggered using the formatted fields and a path to the service.

After a response to the request is received from the service, one or more of the transformation rules are matched to a first representation of the response (operation 310) and applied to the first representation of the response to generate a second representation of the response (operation 312). For example, the first representation of the response may include a data structure that contains a header, body, keys, projections, and/or parameters in the response. As a result, the transformation rule(s) may be used to further filter fields in the response and/or convert the fields from a context in which the API operates (e.g., decoded member keys for members of a social network) to a different context in which the sender of the request operates (e.g., encoded user IDs for users of an application representing the sender).

Finally, transmission of the fields in the second representation of the response to the sender of the request is triggered (operation 314). For example, the fields may be formatted to comply with an expected response to the request and transmitted to a network address and/or other location of the sender.

Figure 4:
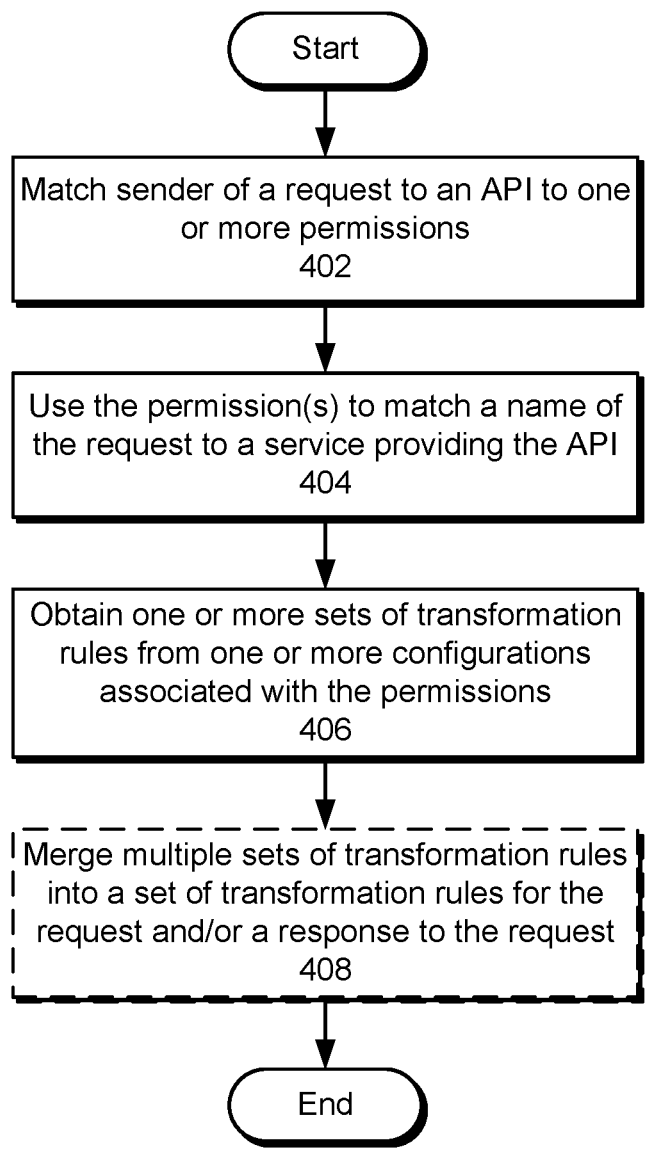
FIG. 4 shows a flowchart illustrating the process of identifying a set of transformation rules that match permissions associated with an API call in accordance with the disclosed embodiments.

FIG. 4 shows a flowchart illustrating a process of identifying a set of transformation rules that match permissions associated with an API call in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a sender of a request to an API is matched to one or more permissions (operation 402). For example, an authentication credential (e.g., an access token) for the sender may be used to retrieve a set of permissions to which the sender is assigned. Each permission may include one or more access control configurations for one or more APIs to which the sender has access.

Next, the permission(s) are used to match a name of the request to a service providing the API (operation 404). For example, each permission may include one or more aliases through which one or more APIs are exposed to entities assigned to the permission. The name of the request may be matched to one of the aliases and used to resolve a path for the API and/or the service providing the API.

One or more sets of transformation rules are then obtained from one or more configurations associated with the permissions (operation 406). For example, each set of transformation rules may be specified in an access control configuration associated with or represented by a permission assigned to the sender. The transformation rules and/or access control configuration may be included with aliases and/or other components of the permission, or different components of the permission may be stored in different locations (e.g., database tables, files, etc.) and linked to one another through keys, paths, and/or other identifiers.

Each permission may additionally include one or more access control configurations. As a result, the sender may be potentially associated with multiple sets of transformation rules to be applied to the same request. When multiple sets of transformation rules exist for the sender and API, the multiple sets are merged into a single set of transformation rules for the request and/or a response to the request (operation 408). For example, inclusivity, projection, and validation rules may be merged by combining allowed fields, field values, and/or other attributes from the rules into a single superset of allowed fields, field values, and/or attributes. On the other hand, override and injection rules may be merged only after the rules pass a conflict check that determines that the rules do not perform different modifications on the same fields. The merged transformation rules may then be applied to the request and/or response to perform dynamic, flexible transformation of API calls, as discussed above.

Figure 5:
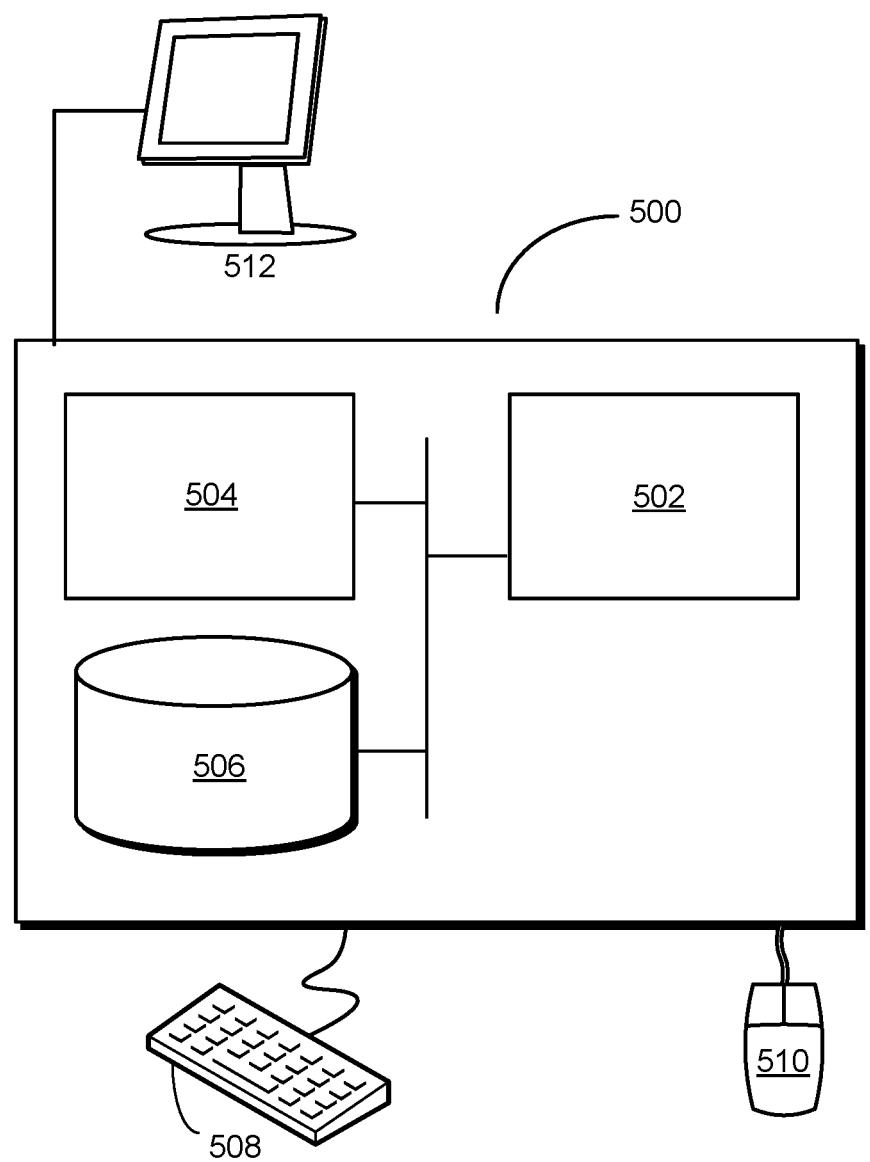
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing rule-based transformation of API calls. The system may include an authorization apparatus and an access-control apparatus, one or both of which may alternatively be termed or implemented as a module, mechanism, or other type of system component. The authorization apparatus may match a sender of a request to an API to one or more permissions. Next, the access-control apparatus may identify a set of transformation rules that match the permission(s). The access-control apparatus may then apply the set of transformation rules to a first set of fields in a first representation of the request to generate a second representation of the request that contains a second set of fields that is different from the first set of fields. Finally, the access-control apparatus may trigger processing of the second representation of the request by a service providing the API.

In addition, one or more components of computer system 500 may be remotely located and connected to the other components over a network. Portions of the present embodiments (e.g., authorization apparatus, access-control apparatus, rules repository, API, sender, etc.) may also be located on different nodes of a distributed system that implements the embodiments. For example, the present embodiments may be implemented using a cloud computing system that dynamically transforms API calls between a set of remote clients and a set of services providing the APIs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   identifying, by one or more computer systems, a set of transformation rules that match one or more permissions associated with a first representation of a request to an application-programming interface (API) by:
   matching a sender of the request to the one or more permissions;
   using the one or more permissions to match a name of the request to a service providing the API; and
   obtaining the set of transformation rules from one or more configuration associated with the one or more permissions;
   applying, by the one or more computer systems, the set of transformation rules to a first set of fields in the first representation of the request to generate a second representation of the request, wherein the second representation of the request comprises a second set of fields that is different from the first set of fields; and
   triggering processing of the request, by the service using the second set of fields.

2. The method of claim 1, wherein obtaining the set of transformation rules from the one or more configurations associated with the one or more permissions comprises:
   merging multiple sets of transformation rules associated with the one or more configurations into the set of transformation rules.

3. The method of claim 1, further comprising:
   matching one or more transformation rules in the set of transformation rules to a first representation of a response to the request from the service;
   applying the one or more transformation rules to the first representation of the response to generate a second representation of the response, wherein the second representation of the response comprises a third set of fields; and
   triggering transmission of the third set of fields to the sender of the request.

4. The method of claim 1, wherein the set of transformation rules comprises a projection rule that specifies a set of allowed fields in the response to the request.

5. The method of claim 1, wherein the set of transformation rules comprises an inclusivity rule that specifies a set of allowed fields in the request.

6. The method of claim 1, wherein the set of transformation rules comprises a validation rule that validates a value of a field in the request.

7. The method of claim 1, wherein the set of transformation rules comprises an override rule that overrides a value of a field in the request.

8. The method of claim 1, wherein the set of transformation rules comprises an injection rule that injects a value into a field in the request.

9. The method of claim 1, further comprising:
   generating the first representation as a data structure comprising the first set of fields.

10. The method of claim 1, wherein the first set of fields comprises at least one of:
    a header;
    a body;
    a parameter; or
    a key.

11. The method of claim 2, wherein merging the multiple sets of transformation rules further comprises:
    determining whether the multiple sets of transformation rules perform different modifications on the same fields in the request.

12. An apparatus, comprising:
    one or more processors; and
    memory storing instructions that, when executed by the one or more processors, cause the apparatus to:
    identify a set of transformation rules that match one or more permissions associated with a first representation of a request to an application-programming interface (API) by:
    matching a sender of the request to the one or more permissions;
    using the one or more permissions to match a name of the request to a service providing the API; and
    obtaining the set of transformation rules from one or more configurations associated with the one or more permissions;
    apply the set of transformation rules to a first set of fields in the first representation of the request to generate a second representation of the request, wherein the second representation of the request comprises a second set of fields that is different from the first set of fields; and
    trigger processing of the request, by the service, using the second set of fields.

13. The apparatus of claim 12, wherein obtaining the set of transformation rules from the one or more configurations associated with the one or more permissions comprises:
    merging multiple sets of transformation rules associated with the one or more configurations into the set of transformation rules.

14. The apparatus of claim 13, wherein merging the multiple sets of transformation rules comprises at least one of:

merging multiple allowed attributes from the multiple sets of transformation rules into a single superset of allowed attributes in the set of transformation rules; and checking the multiple sets of transformation rules for conflicts prior to merging the multiple sets of transformation rules.

15. The apparatus of claim 12, wherein the memory further stores instructions that, when executed by the one or more processors, further cause the apparatus to:

match one or more transformation rules in the set of transformation rules to a first representation of a response to the request from the service;

apply the one or more transformation rules to the first representation of the response to generate a second representation of the response, wherein the second representation of the response comprises a third set of fields; and trigger transmission of the third set of fields to the sender of the request.

16. The apparatus of claim 12, wherein the set of transformation rules comprises at least one of:

a projection rule that specifies a set of allowed fields in the response to the request;

an inclusivity rule that specifies a set of allowed fields in the request;

a validation rule that validates a value of a field in the request;

an override rule that overrides a value of a field in the request; or an injection rule that injects a value into a field in the request.

17. The apparatus of claim 12, wherein the first set of fields comprises at least one of:

a header;
a body;
a parameter; or
a key.

18. The apparatus of claim 13, wherein merging the multiple sets of transformation rules further comprises:

determining whether the multiple sets of transformation rules perform different modifications on the same fields in the request.

19. A system, comprising:

an authorization module comprising a non-transitory computer-readable medium storing instructions that, when executed, cause the system to:

match a sender of a request to an application-programming interface (API) to one or more permissions; and use the one or more permissions to match a name of the request to a service providing the API; and an access-control module comprising a non-transitory computer-readable medium storing instructions that, when executed, cause the system to:

identify a set of transformation rules that match the one or more permissions;

apply the set of transformation rules to a first set of fields in a first representation of the request to generate a second representation of the request, wherein the second representation of the request comprises a second set of fields that is different from the first set of fields; and trigger processing of the request, by the service, using the second set of fields.

20. The system of claim 19, wherein the set of transformation rules comprises at least one of:

a projection rule that specifies a set of allowed fields in a response to the request;

an inclusivity rule that specifies a set of allowed fields in the request;

a validation rule that validates a value of a field in the request;

an override rule that overrides a value of a field in the request; or an injection rule that injects a value into a field in the request.

* * * * *